No. 660,412. Patented Oct. 23, 1900.
C. BONJOUR.
DISTRIBUTING MECHANISM FOR STEAM OR OTHER FLUID PRESSURE ENGINES.
(Application filed Aug. 5, 1899.)
(No Model.) 6 Sheets—Sheet 1.
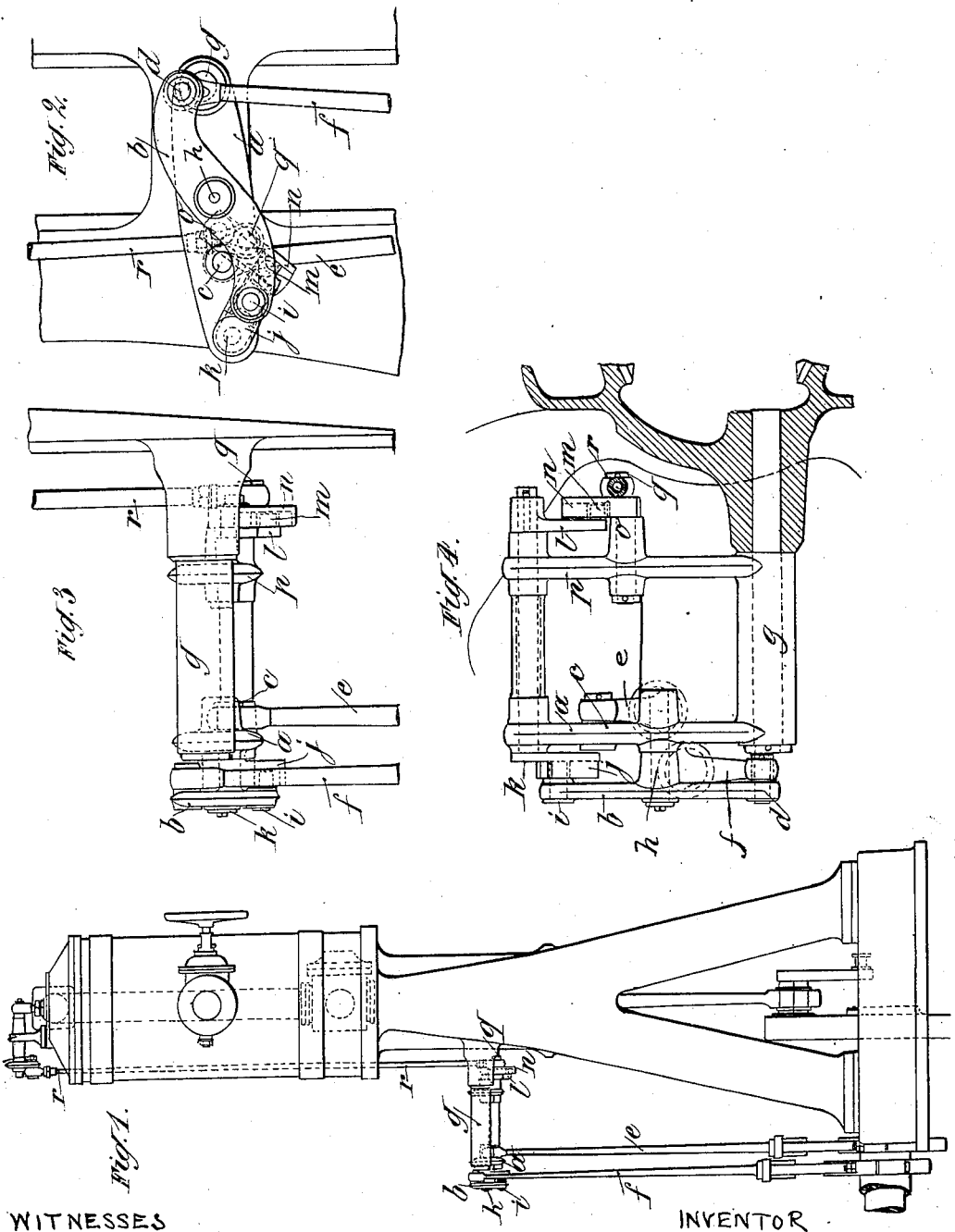
WITNESSES
Edith J. Griswold.
Walter Abt
INVENTOR
Claude Bonjour
by his attorneys
Howson and Howson No. 660,412. Patented Oct. 23, 1900.
C. BONJOUR.
DISTRIBUTING MECHANISM FOR STEAM OR OTHER FLUID PRESSURE ENGINES.
(Application filed Aug. 5, 1899.)
(No Model.) 6 Sheets—Sheet 2.

WITNESSES
Edith J. Griswold
Walter Abb

INVENTOR
Claude Bonjour
by his attorneys
Howson and Howson

No. 660,412. Patented Oct. 23, 1900.
C. BONJOUR.
DISTRIBUTING MECHANISM FOR STEAM OR OTHER FLUID PRESSURE ENGINES.
(Application filed Aug. 5, 1899.)
(No Model.) 6 Sheets—Sheet 3.
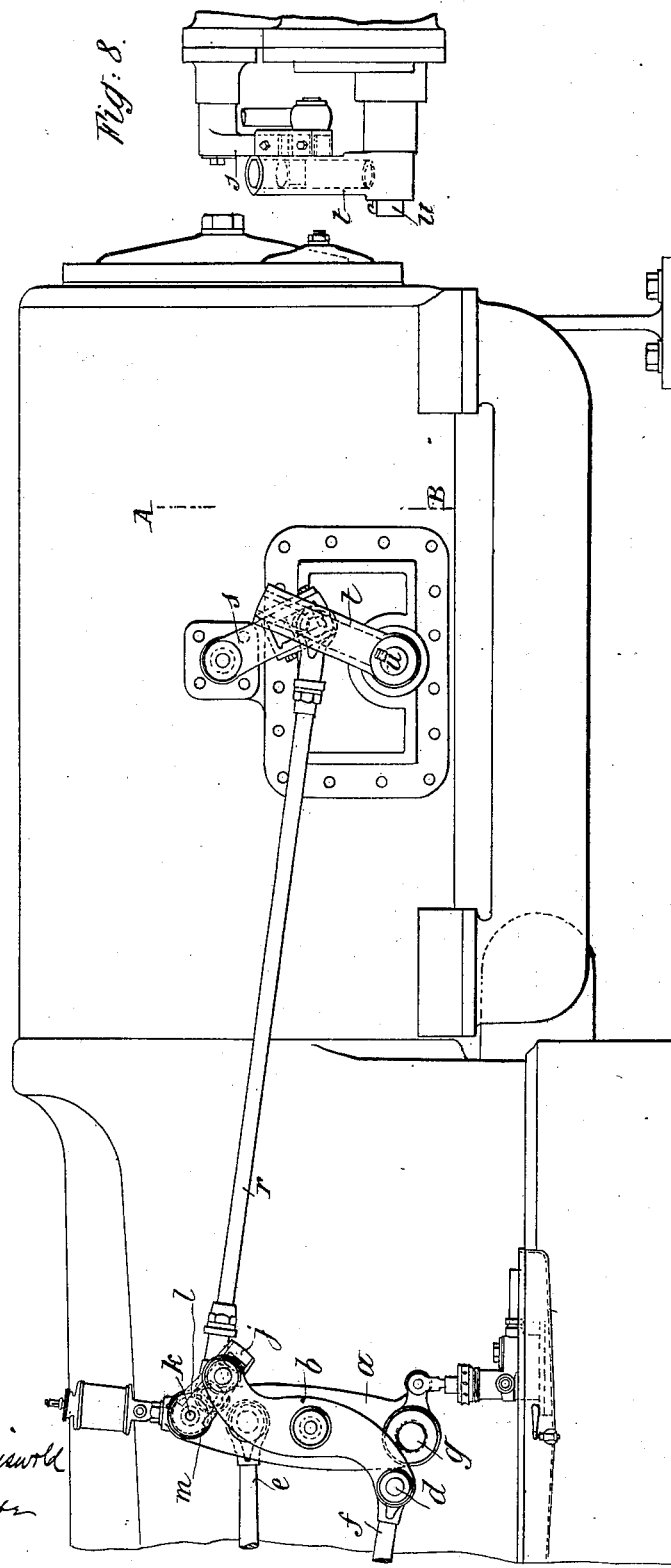
WITNESSES
Edith J. Griswold
Walter Abbe
INVENTOR
Claude Bonjour
by his attys.
Houston and Houston No. 660,412. Patented Oct. 23, 1900.
C. BONJOUR.
DISTRIBUTING MECHANISM FOR STEAM OR OTHER FLUID PRESSURE ENGINES.
(Application filed Aug. 5, 1899.)
(No Model.) 6 Sheets—Sheet 4.

WITNESSES
Edith J. Griswold
Walter Ath

INVENTOR
Claude Bonjour
by his attorneys
Howson and Howson

No. 660,412. Patented Oct. 23, 1900.
C. BONJOUR.
DISTRIBUTING MECHANISM FOR STEAM OR OTHER FLUID PRESSURE ENGINES.
(Application filed Aug. 5, 1899.)
(No Model.) 6 Sheets—Sheet 5.
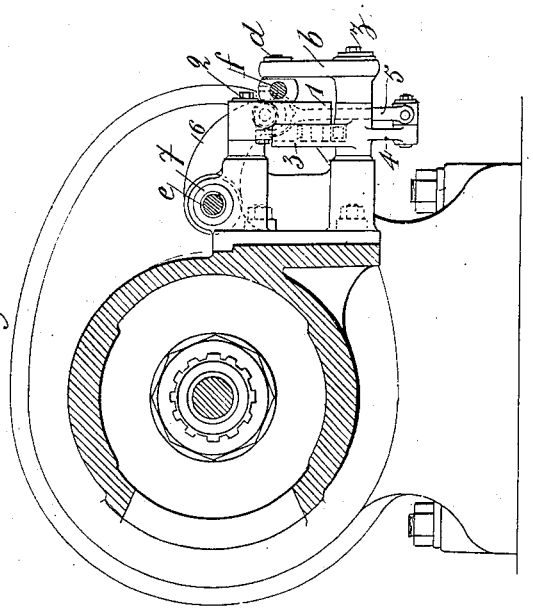
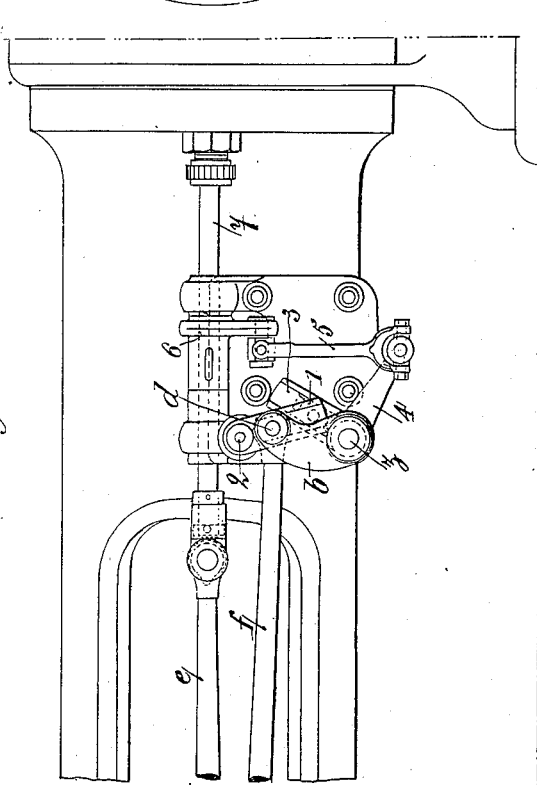
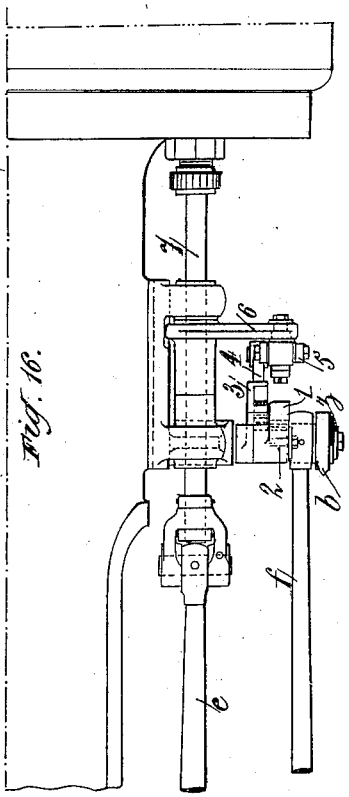
WITNESSES
INVENTOR
Claude Bonjour
by his attorneys

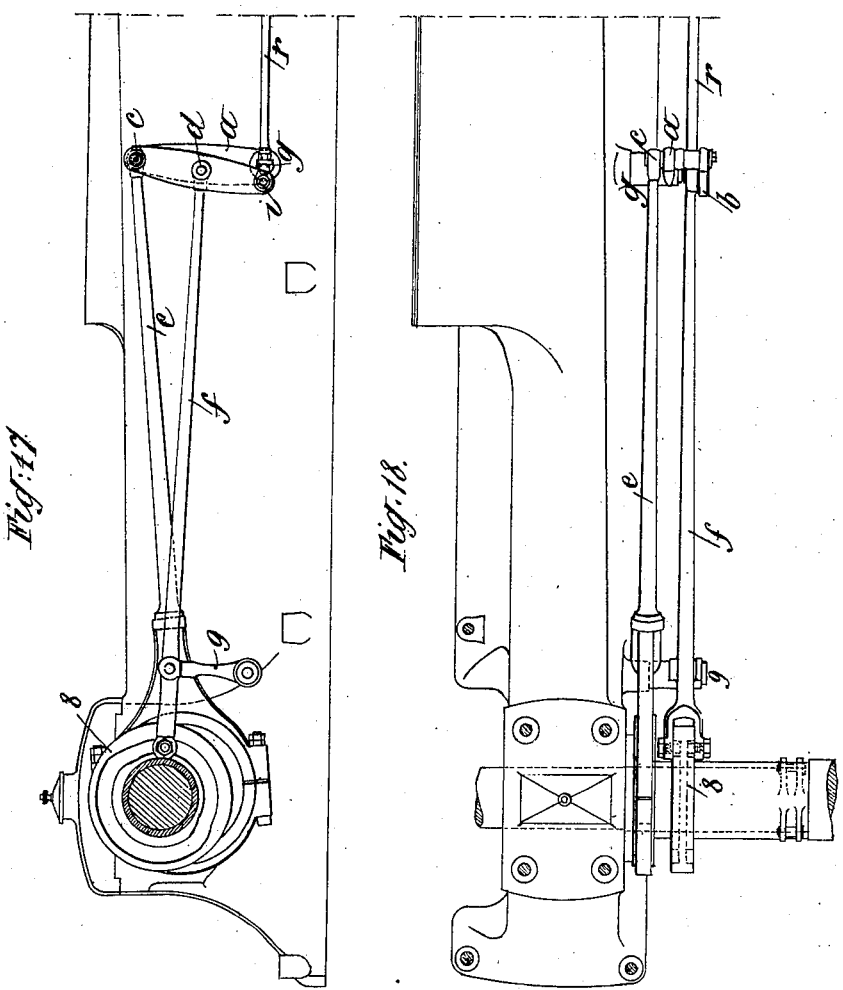

UNITED STATES PATENT OFFICE.

CLAUDE BONJOUR, OF PARIS, FRANCE.

DISTRIBUTING MECHANISM FOR STEAM OR OTHER FLUID-PRESSURE ENGINES.

SPECIFICATION forming part of Letters Patent No. 660,412, dated October 23, 1900.

Application filed August 5, 1899. Serial No. 726,314. (No model.)

*To all whom it may concern:*

Be it known that I, CLAUDE BONJOUR, a citizen of the Republic of France, residing in Paris, France, have invented certain new and useful Improvements in and Relating to the Distributing Mechanism for Steam or other Fluid-Pressure Engines, of which the following is a specification.

This invention relates to a mechanism having unified differential movements intended for the actuation of distributing parts of any kinds—such as slide-valves, piston-valves, valves, obturators, &c.—and which is applicable to any motor operated by means of fluids under pressure whatever may be its type or system. This mechanism is represented in the accompanying drawings, in which—

Figure 5:
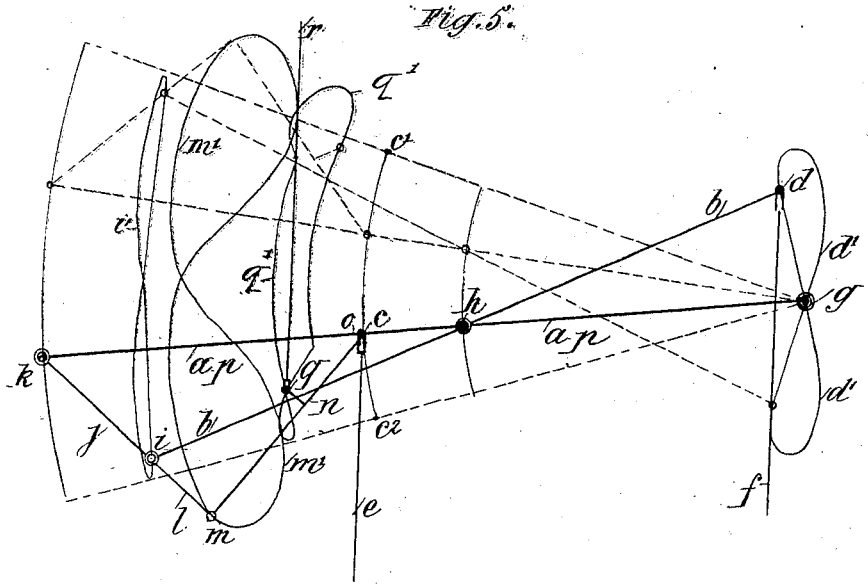
Figure 6:
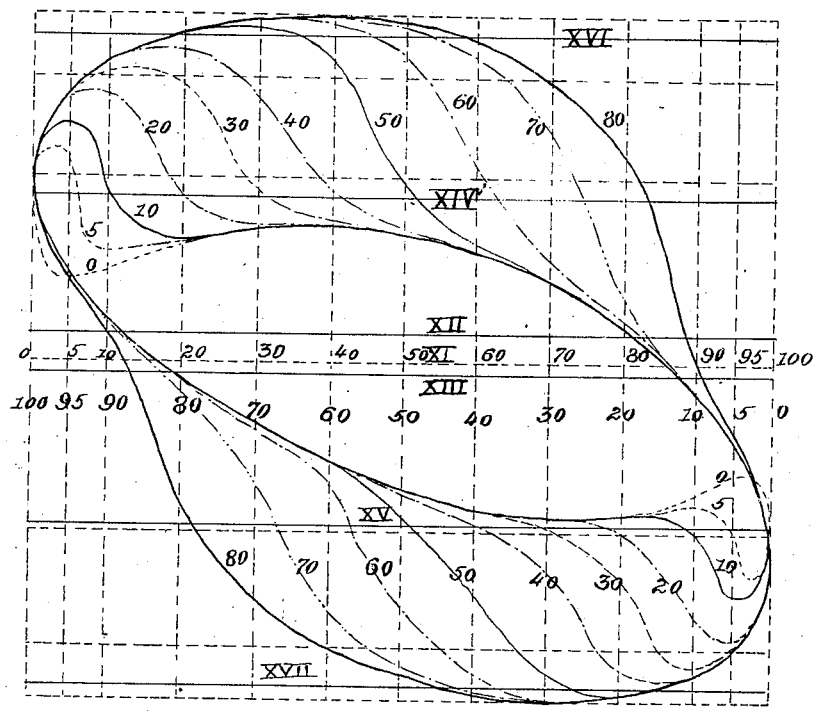
Figure 10:
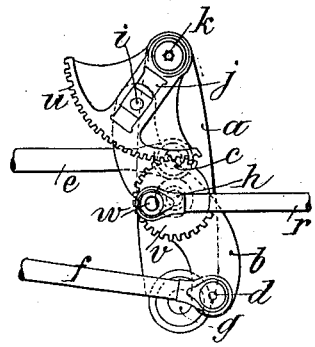
Figure 11:
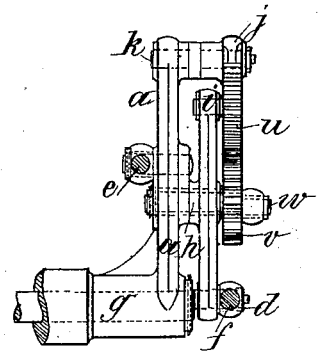
Figure 12:
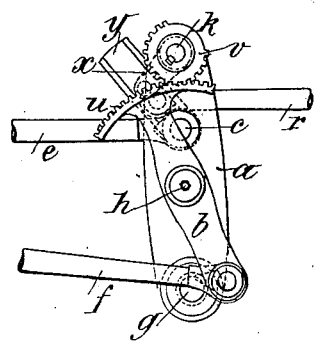
Figure 13:
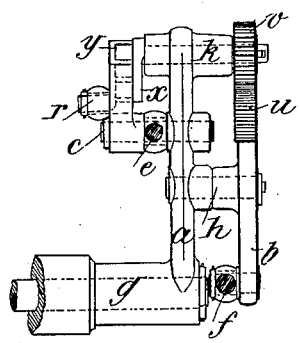
Figure 9:
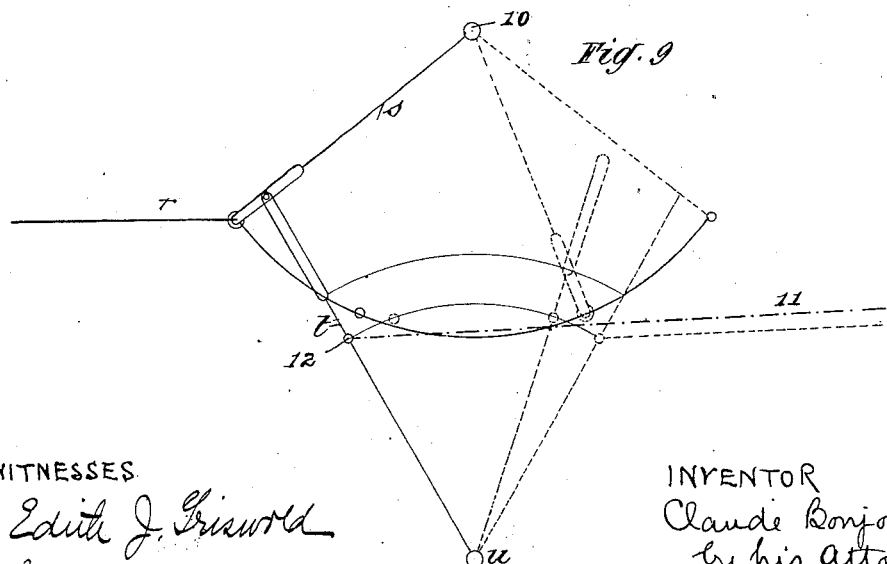

Figure 1 shows the mechanism in question as a whole applied to the actuation of the distributing mechanism of a vertical steam-engine. Figs. 2, 3 and 4 are respectively a front elevation, a side elevation, and a plan view, of the mechanism considered separately. Fig. 5 is a diagram of the movements of the various parts of the distributing mechanism. Fig. 6 is a diagram showing the periods during which the distributing mechanism is open. Fig. 7 shows a modification of the distributing mechanism and its application to a horizontal steam-engine. Fig. 8 is a section taken on the line A B of Fig. 7. Fig. 9 is a diagram relating to the modification shown in Figs. 7 and 8. Figs. 10 and 11 represent a further modification of the distributing mechanism. Figs. 12 and 13 represent another modification of the distributing mechanism. Figs. 14, 15, and 16 represent a still further modification of the distributing mechanism and its application to a horizontal steam-engine. Figs. 17 and 18 represent still another modification of which the distributing mechanism is capable.

The distributing mechanism represented in Figs. 1, 2, 3, and 4 comprises two levers $a$ and $b$, pivoted, respectively, at $c$ and $d$ to the bars $e$ and $f$ of the eccentrics, one of which is intended for distribution and the other for expansion. The distribution-eccentric is rigidly fixed upon the driving-shaft of the machine and participates in all its movements. The expansion-eccentric, although connected with the driving-shaft, is connected with a governor which regulates its angle of attachment, as in the case of all distributing mechanisms.

The lever $a$ oscillates upon an axis $g$, situated at a fixed point of the framework of the machine. The lever $b$ oscillates upon an axis $h$, which is rigidly connected with the lever $a$.

The extremity $i$ of the lever $b$ is connected, by means of a pin and a slide-block, to a slideway $j$, to which it transmits a reciprocating movement, as is hereinafter explained. This slideway $j$ is provided with an axis, enabling its rotation around the point $k$, situated at the extremity of the lever $a$. Upon the axis of oscillation $k$ of this slideway $j$ is keyed a crank $l$, which by means of its stud and slide-block $m$ actuates another slideway $n$, to which an angular reciprocating motion is also imparted, such motion being around the point $o$, situated upon a lever $p$, parallel with the lever $a$, with which it is rigidly connected. It is also this latter slideway $n$ which, by means of the axis $q$ rigidly connected therewith, actuates the traction-rod $r$ of the distributing parts.

Referring to the diagram shown in Fig. 5, the paths described by the various parts of the distributing mechanism above described may readily be followed. The pivot $c$ of the bar $e$ of the distribution-eccentric describes the arc $c'\ c^2$. The pivot $d$ of the bar $f$ of the expansion-eccentric describes the path represented by the curve $d'$, while the extremity $i$ of the lever $b$ describes the path represented by the curve $i'$. Owing to the combination of the angular movements transmitted by the two eccentrics to their respective levers $a$ and $b$ the pin $m$ of the crank $l$, keyed upon the axis of oscillation $k$ of the slideway $j$, describes a path represented by the curve $m'$. It follows from the combination of the movements as a whole that the pin $q$, forming a rigid whole with the slideway $n$, describes a path represented by the curve $q'$. This special curve, becoming modified in proportion as the governor alters the angle of fixing of the expansion-eccentric, enables distributing parts of any kind to be actuated by means of the pin $q$, as indicated by the regulating-curves represented in Fig. 6. The mechanism in question, which consists in the interposition and combination of the slideways $j$ and $n$, thus enables extremely-accentuated periods of retardation and also periods of acceleration to be obtained regarding the movements of the pin $q$. The periods of retardation serve, by reducing the action of the expansion-eccentric during a considerable angle of the travel of the crank, to allow that of the distribution-eccentric to preponderate and by this fact to insure the independence between its movement and that of the expansion-eccentric. The periods of acceleration, on the contrary, serve to increase the intensity of the action of the expansion-eccentric in proportion to that of the distributing-eccentric, this intensity of action taking place during a very small angle of the travel of the crank. The periods of retardation coincide with those of the opening of the orifices by the distributer or distributers and the periods of acceleration with those of the closing of the said orifices. It will thus be readily understood that the combination of the movement as a whole serves to effect the rapid closing of the admission-orifices and to maintain between zero and sixty-five per cent. of the stroke of the piston constant advances and compressions, as will be seen from an examination of the regulation-curves represented in Fig. 6. In this diagram the different elements of the slide-valve and the ports are represented by the numbered horizontal lines, while the vertical dotted lines 5 10 20 30, &c., represent the different fractions of the stroke of the piston, and, all the elements of the distribution being thus combined, the curved lines 0 5 10 20 30, &c., show clearly the phases of that distribution with reference to the different positions of the angle of connection of the expansion-eccentric with the shaft under the control of the governor.

It should be understood that the distributing mechanism above described is capable of numerous modifications which do not in any way change its method of action, the said mechanism consisting of two movements connected together and yet independent, one of them taking place at invariable periods with respect to the position of the driving-crank and the other, on the other hand, at periods which are variable either at will or under the influence of the governor, the two movements being connected by means of any suitable unification mechanism which will produce for the actuation of distributing parts of any kind curves similar to those represented in Fig. 6, whatever may be the mechanical combinations employed to obtain this effect.

The variability above referred to can be obtained either by some mechanism changing the angle of connection of the expansion-eccentric with the shaft or by any other suitable means. An important feature of my invention is the interposition in the unifying mechanism of a system of slides, simple or compound, with toothed sectors or any other suitable mechanism for modifying the initial movement of the expansion mechanism, dividing it into successive periods of retardation and acceleration. Figs. 7 and 8 show in this connection a modification of the distributing mechanism. In this modification the levers $a$ and $b$ are retained, and they are arranged in exactly the same manner as that above indicated, being connected with the bars $e$ and $f$, respectively. The difference consists in the fact that the mechanism comprises only one slideway, the slideway $j$, pivoted at $k$ upon the lever $a$, and of which the pivot is provided with the crank $l$, which directly actuates the distributing slide-valve by means of the driving-rod $r$. Nevertheless, in order to still further improve the results obtained by the employment of the distributing mechanism instead of directly actuating the slide-valve by means of the said mechanism there may be interposed between these two parts a second mechanism upon the same principle comprising periods of retardation and acceleration and serving to reduce the total travel of the slide-valve, while at the same time increasing the openings of the orifices for small admissions. This mechanism consists of two special slideways $s$ and $t$, the slide-blocks of which are rigidly connected, and thus couple the said slideways. One of these slideways, $s$, is connected with the unification mechanism, while the other, $t$, transmits its movement to the slide-valve either by means of its axis of oscillation $u$ or by means of a connecting-rod of any suitable kind, having regard to the machine as a whole and to the applications for which it is intended.

The law of the variations of the angular movements and also that of the periods of repose of the said mechanism is illustrated by the diagram represented in Fig. 9. In this diagram the lever $s$, oscillating on a center 10, is actuated by the bar $r$ and in turn actuates, through slides, as described, a second lever $t$, oscillating on the center $u$, and this second lever actuates the slide-valve either at the center of oscillation or by the aid of a rod 11, pivoted to the lever $t$ at 12. It will be seen from this diagram that by the combination of the two slide-levers the slide-valve will be subjected to a progressive retardation, reaching its maximum at the middle of the stroke. Then when the lever $t$ reaches the end of its movement it has a moment of stoppage, while allowing the lever $s$ to continue its movement. Then the reverse movement takes place and the parts continue symmetrically their movements in the opposite direction.

If the said mechanism is intended to actuate a fixed expansion distribution, it may be greatly simplified. In this case the crank $l$, actuating the slide-valve, is not provided with a slideway, but its pin $m$ is rigidly fixed and then directly attacks the slide-block and the slideway $s$, connected with the unification mechanism.

In the modification represented in Figs. 10 and 11 there are also retained the lever $a$, oscillating at $g$ and connected at $c$ to the bar $e$ of the eccentric, and also the lever $b$, oscillating at $h$ upon the lever $a$ and connected at $d$ to the bar $f$ of the eccentric. The extremity $i$ of the lever $b$ is also connected, by means of a pin and a slide-block, to the slideway $j$, oscillating at $k$ upon the lever $a$, with this difference that the said slideway $j$ is combined with a toothed sector $u$ in engagement with a pinion $v$, mounted loosely upon the axis of oscillation $h$, and provided with a crank-pin $w$, acting upon the distributer by means of the connecting-rod $r$.

In the modification represented in Figs. 12 and 13 the lever $b$, oscillating at $h$ upon the lever $a$, is itself provided with the toothed sector $u$ in engagement with the pinion $v$, the axis of which, situated at $k$ upon the lever $a$, is provided with a crank $x$, the pin of which engages in a slideway $y$, oscillating at $c$ upon the lever $a$, and upon which is adjusted the connecting-rod $r$, serving to actuate the distributer.

Figs. 14, 15, and 16 represent another modification, in which the lever $a$ is omitted, while the lever $b$, connected at $d$ with the bar $f$ of the expansion-eccentric, is arranged so as to oscillate upon a fixed axis $z$. At $d$ the lever is provided with a spindle engaged in a slideway 1, oscillating upon a fixed axis 2 and itself connected by means of a slide-block to a second slideway 3, oscillating upon the fixed shaft $z$ and connected by means of its arm 4 with a connecting-rod 5, attached to a lever 6, rigidly connected with the rod 7 of the slide-valve. There is imparted to this slide-valve a reciprocating rectilinear movement, which is transmitted to it by the bar $e$ of the distributing-eccentric. Here it is circular, and its admission edges terminate in a helicoidal section corresponding with that of the admission-orifices. The expansion-eccentric $f$ instead of acting upon the said slide-valve by modifying, as in the previous case, its reciprocating movement imparts to it, on the contrary, an angular movement, as will be understood from the action of the parts described, the object of which is to effect the rapid closing of the admission-orifices.

In the last modification represented in Figs. 17 and 18 the two levers $a$ and $b$ are retained, the lever $a$ oscillating upon a fixed point $g$ and being connected at $c$ to the bar $e$ of the distributing-eccentric, while the other lever $b$ oscillates at the extremity of the lever $a$ and is connected at $d$ to the bar $f$ of the expansion-eccentric. The extremity $i$ of this lever $b$ is in this case directly connected with the rod $r$, serving to actuate the distributer. The difference consists in this case in the fact that the "expansion-eccentric," properly so called, is replaced by a plate 8, grooved upon its two faces in accordance with an eccentric curve. The free extremity of the bar $f$ is forked and embraces the edge of the said plate. This fork is provided with rollers engaged in the grooves of the said plate. In addition to this it is maintained by means of a lever 9, oscillating around a fixed point. Under the influence of the rotation of the eccentrically-grooved plate 8 the bar $f$ modifies the relative position of the levers $a$ and $b$, and consequently modifies the periods of the travel imparted to the distributer by the distributing-eccentric.

The various modifications above described only serve to demonstrate that the mechanism above described having unified differential movements is capable of undergoing numerous modifications of detail.

I claim—

1. The combination of the valve of a steam or other motor with a driving-shaft therefor and two connecting means between the driving-shaft and the valve, one such means being in variable connection with the shaft and the other in invariable connection with it and unification mechanism coupling said two connecting means together, whereby the duration of admission may be varied, while keeping the advances and compressions constant, all substantially as described.

2. The combination of the valve of a steam or other motor with a driving-shaft and two eccentrics, one having a fixed relation to the said shaft and the other adjustable as to its angle of connection, means connecting each eccentric with the valve and unification mechanism coupling said two connecting means together, as and for the purpose described.

3. The combination of the valve of a steam or other motor with a driving-shaft, two eccentrics thereon, one fixed and the other adjustable as to its angle of connection, means connecting each eccentric with the valve and unification mechanism coupling said two connecting means together, as and for the purpose described.

4. The combination of the valve of a steam or other motor with a driving-shaft and two eccentrics one having a fixed relation to the said shaft and the other variable as to angle of connection and slideway connections between the eccentrics and the valves, as and for the purpose described.

5. The combination of the valve of a steam or other motor with a driving-shaft and two eccentrics, one having an invariable and the other a variable connection with the shaft, two levers, one oscillating upon a fixed center and connected with the said invariable eccentric, while the other lever is pivoted to the first one and connected with the variable eccentric and a slideway and a crank operated by said levers and controlling the valve, substantially as and for the purpose described.

6. The combination of the valve of a steam or other motor with a driving-shaft and two eccentrics one having an invariable and the other a variable connection with the shaft, two levers one oscillating upon a fixed center and connected with said invariable eccentric, while the other lever is pivoted to the first one, and connected with the variable eccentric and two slides and a crank operated by said levers and controlling the valve, all substantially as described.

In testimony whereof I have signed my name to this specification in the presence of two subscribing witnesses.

CLAUDE BONJOUR.

Witnesses:
LEON FRANCKEN,
EDWARD P. MACLEAN.